(12) United States Patent
Kemble et al.

(10) Patent No.: US 7,072,837 B2
(45) Date of Patent: Jul. 4, 2006

(54) METHOD FOR PROCESSING INITIALLY RECOGNIZED SPEECH IN A SPEECH RECOGNITION SESSION

(75) Inventors: Kimberlee A. Kemble, Boca Raton, FL (US); James R. Lewis, Delray Beach, FL (US); Vanessa V. Michelini, Coconut Creek, FL (US); Margarita Zabolotskaya, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 09/809,904

(22) Filed: Mar. 16, 2001

(65) Prior Publication Data

US 2002/0133346 A1 Sep. 19, 2002

(51) Int. Cl.
*G10L 15/18* (2006.01)

(52) U.S. Cl. .................. 704/257; 704/252; 704/255

(58) Field of Classification Search ........... 704/254, 704/256, 251, 257, 252, 255
See application file for complete search history.

(56) References Cited

U.S. PATENT DOCUMENTS

| | | | | |
|---|---|---|---|---|
| 4,882,757 A * | 11/1989 | Fisher et al. | ................ | 704/253 |
| 5,696,962 A * | 12/1997 | Kupiec | ........................... | 707/4 |
| 5,797,123 A * | 8/1998 | Chou et al. | ................ | 704/256 |
| 6,070,140 A * | 5/2000 | Tran | ........................... | 704/275 |
| 6,173,261 B1 * | 1/2001 | Arai et al. | ................... | 704/257 |
| 6,424,983 B1 * | 7/2002 | Schabes et al. | ............. | 715/533 |
| 6,499,013 B1 * | 12/2002 | Weber | ......................... | 704/257 |
| 6,526,380 B1 * | 2/2003 | Thelen et al. | ................ | 704/251 |
| 6,615,178 B1 * | 9/2003 | Tajima | ........................ | 704/277 |
| 6,631,346 B1 * | 10/2003 | Karaorman et al. | ........... | 704/9 |
| 6,922,810 B1 * | 7/2005 | Trower et al. | .............. | 715/534 |

* cited by examiner

*Primary Examiner*—Wayne Young
*Assistant Examiner*—Michael N. Opsasnick
(74) *Attorney, Agent, or Firm*—Akerman Senterfitt

(57) ABSTRACT

In a speech recognition session, a method of speech processing utilizing a plurality of grammars can include a series of steps. The method can include spawning a separate thread of execution corresponding to each one of a plurality grammars and allocating a post-processing recognition task to each separate thread of execution. Each post-processing recognition task can produce a possible recognition result using the corresponding grammar. A possible recognition result produced by one of the post-processing recognition tasks can be identified.

16 Claims, 4 Drawing Sheets

METHOD FOR PROCESSING INITIALLY RECOGNIZED SPEECH IN A SPEECH RECOGNITION SESSION

CROSS REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

1. Technical Field

This invention relates to the field of speech recognition systems, and more particularly, to processing the same utterance with multiple grammar subsets.

2. Description of the Related Art

Speech recognition is the process by which an acoustic signal received by microphone is converted to a set of text words by a computer. These recognized words can be used in a variety of computer applications, for example, software applications, for purposes such as document preparation, data entry, and command and control. Speech recognition systems programmed or trained to the diction and inflection of a single person can successfully recognize the vast majority of words spoken by that person.

In operation, speech recognition systems can model and classify acoustic signals to form acoustic models, which are representations of basic linguistic units referred to as phonemes. Upon receipt of the acoustic signal, the speech recognition system can analyze the acoustic signal, identify a series of acoustic models within the acoustic signal and derive a list of potential word candidates for the given series of acoustic models. Subsequently, the speech recognition system can contextually analyze the potential word candidates using a language model as a guide.

The task of the language model is to express restrictions imposed on the manner in which words can be combined to form sentences. The language model can express the likelihood of a word appearing immediately adjacent to another word or words. Language models used within speech recognition systems typically are statistical models. Examples of well-known language models suitable for use in speech recognition systems include uniform language models, finite state language models, and n-gram language models.

Acoustic models for a particular speaker can be refined during the operation of the speech recognition system to improve the system's accuracy. That is, the speech recognition system can observe speech dictation as it occurs and can modify the acoustic model accordingly. Typically, an acoustic model can be modified when a speech recognition training program analyzes both a known word and the recorded audio of a spoken version of the word. In this way, the speech training program can associate particular acoustic waveforms with corresponding phonemes contained within the spoken word.

The accuracy of a speech recognition system can be further improved by the use of a grammar. The grammar is a model which can be used to designate syntactically proper sentences which can be derived from a vocabulary of words. During processing, the grammar can be used to select between syntactically correct and incorrect outputs based on syntactical associations that can be represented in a state transition network. While a grammar can be effective, its usefulness can be limited. For example, in a speech recognition session, the speech recognition process is limited to traversal of only the exact paths defined by the state transition network. Furthermore, if multiple grammars are employed to improve accuracy by adding more context selections, then duplication of items amongst the various grammars can result in ambiguities within the grammars. In particular, the system will not know which path within the state transition networks is appropriate.

Another problem associated with using grammars can be the size of the grammar. The larger the grammar, the greater the state transition network, and the greater the number of paths that have to be traversed in the network. This increased time required to traverse the state transition network corresponds to increased processing time, which in turn translates to increased delay. The delays can result in the system losing its "natural" feel to users and in certain applications, for example, telephony, this increased delay can be unacceptable and costly.

SUMMARY OF THE INVENTION

The invention disclosed herein concerns a method for processing speech in a speech recognition session using a plurality of grammars. In particular, speech recognition tasks can be allocated to separate threads of execution. Speech recognition tasks can include processing initially recognized phoneme strings generated by a speech recognition system from one or more speech utterances. The processing can use one or more grammars. Each of the speech recognition tasks, executing in a separate thread of execution, can process speech using one of the plurality of grammar subsets. The grammars can be grammar subsets or groupings of grammar subsets of a unified recognition grammar, with the grammar subsets being smaller than the unified recognition grammar. The unified grammar can be subdivided into a plurality of grammar subsets based upon expected components of a user spoken utterance. Accordingly, each speech recognition task can produce a possible recognition result. The most likely recognition result can be selected from the possible recognition results.

In one embodiment of the invention, the method can include spawning a separate thread of execution corresponding to each one of the plurality grammars. Notably, the grammar can be a grammar subset of a unified grammar or a group of grammar subsets containing no duplicate grammar rules such that there is no ambiguity in the resulting grammar subset group. A processing recognition task can be allocated to each separate thread of execution. Each processing recognition task can produce a possible recognition result using the corresponding grammar. A possible recognition result produced by one of the processing recognition tasks can be identified.

Another embodiment of the invention can include determining a confidence score for each possible recognition result. In that case, the identifying step can identify a possible recognition result having the highest confidence score. The method further can include assigning a unique priority code to each one of the plurality of grammars. The identifying step can identify the possible recognition result produced using one of the plurality of grammars having a particular unique priority code.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention concerns a method for processing speech in a speech recognition session using a plurality of grammars. In particular, speech recognition tasks can be allocated to separate threads of execution speech recognition tasks can include processing initially recognized phoneme strings generated by a speech recognition system from one or more speech utterances. The processing can use one or more grammars. Each of the speech recognition tasks, executing in a separate thread of execution, can process phoneme strings using one of the plurality of grammars. Accordingly, each speech recognition task can produce a possible recognition result. The most likely recognition result can be selected from the possible recognition results.

The grammars can be grammar subsets of a unified recognition grammar, with the grammar subsets being smaller than the unified recognition grammar. The unified grammar can be subdivided into a plurality of grammar subsets based upon expected components of a user spoken utterance. For example, in a directory assistance application, a speech recognition system can typically receive user spoken utterances including components such as names, telephone numbers, and cities. Thus, the unified grammar can be subdivided into grammar subsets, each corresponding to a commonly received user spoken utterance component type such as a name, telephone number, or a city. For implementations wherein expected utterances can include a larger number of components, the grammar subsets can be combined to create grammar subset groups. In that case, the groups can be utilized as individual grammars wherein each processing task can utilize one of the grammar subset groups to produce a recognition result.

Figure 1:
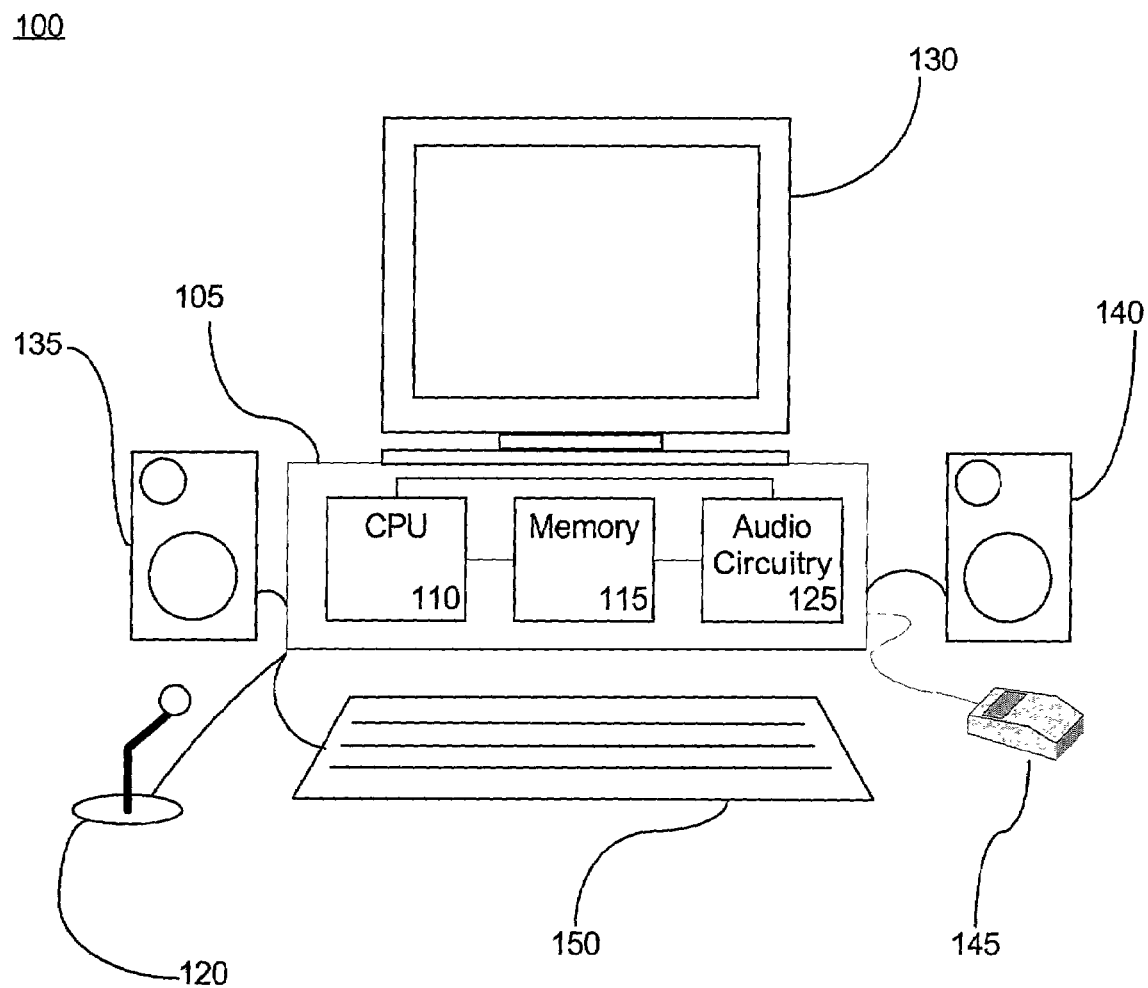
FIG. 1 is a block diagram illustrating an exemplary computing device configured in accordance with one aspect of the inventive arrangements.

FIG. 1 depicts a typical computer system 100 for use in conjunction with the present invention. The system can include a computer 105 including a central processing unit 110 (CPU), one or more memory devices 115, and associated circuitry. The memory devices 115 can be comprised of an electronic random access memory and a bulk data storage medium. The system also can include a microphone 120 operatively connected to the computer system through suitable interface circuitry 125, and an optional user interface display unit 130 such as a video data terminal operatively connected thereto. The CPU can be comprised of any suitable microprocessor or other electronic processing unit, as is well known to those skilled in the art. Speakers 135 and 140, as well as an interface device, such as mouse 145, and keyboard 150, can be provided with the system, but are not necessary for operation of the invention as described herein. The various hardware requirements for the computer system as described herein can generally be satisfied by any one of many commercially available high speed computers.

Figure 2:
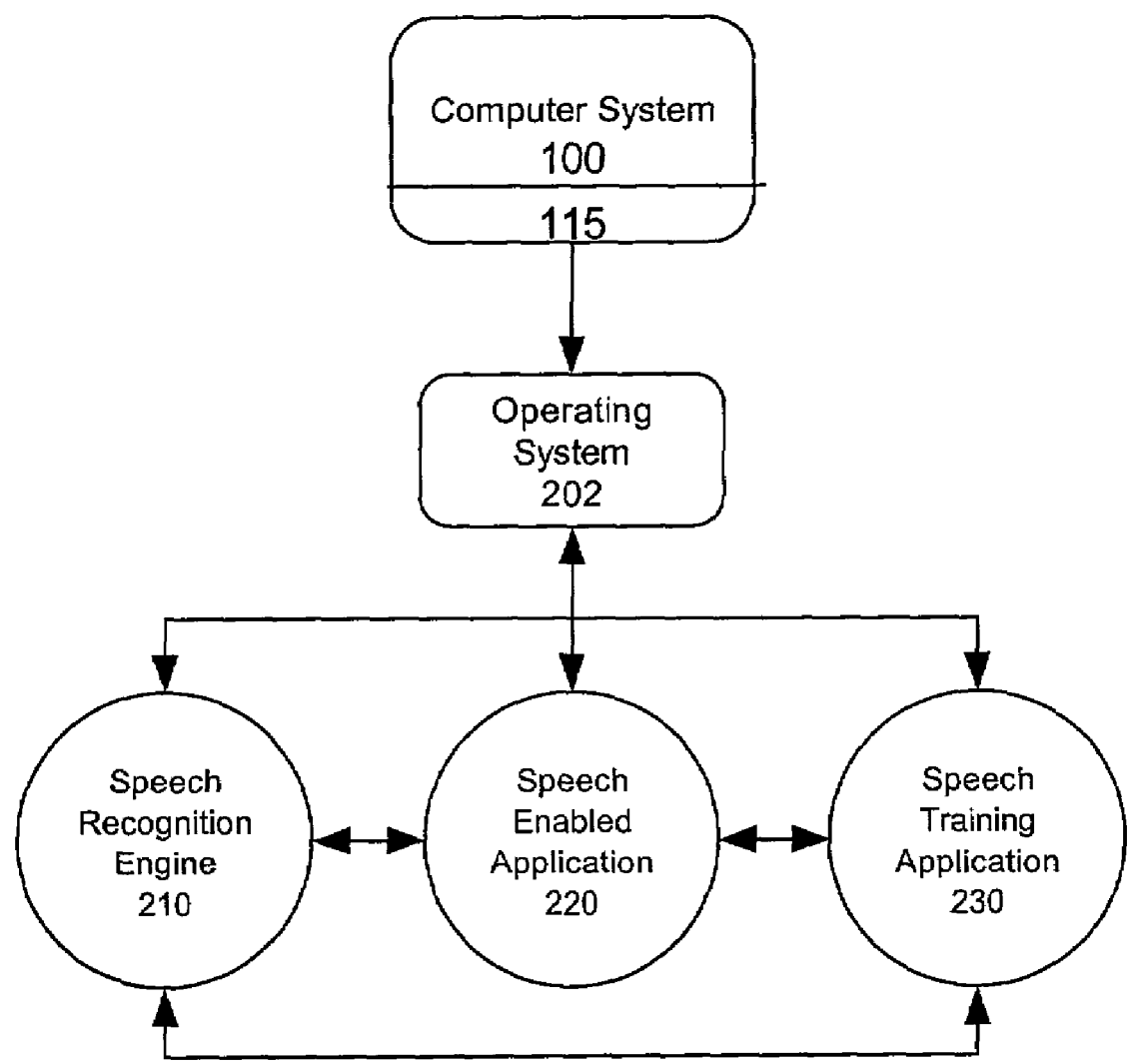
FIG. 2 is a block diagram illustrating an exemplary high level architecture of a speech recognition system for use with the computing device of FIG. 1.

FIG. 2 is a schematic diagram illustrating an exemplary architecture for a speech recognition system which can be used in computer system 100. As shown in FIG. 2, within the memory 1 15 of computer system 100 can be an operating system 202 and a speech recognition engine 210. Also included can be a speech enabled application 220 and a speech training application 230. In FIG. 2, the speech recognition engine 210, speech enabled application 220, and the speech training application 230 are shown as separate application programs. It should be noted however that the invention is not limited in this regard, and these various application programs can be implemented as a single, more complex application program. For example the speech recognition engine 210 can be combined with the speech enabled application 220 or with any other application to be used in conjunction with the speech recognition engine 210.

The aforementioned components can be realized in a centralized fashion within the computer system 100. Alternatively, the aforementioned components can be realized in a distributed fashion where different elements are spread across several interconnected computer systems. In any case, the components can be realized in hardware, software, or a combination of hardware and software. Any kind of computer system, or other apparatus adapted for carrying out the methods described herein is suited. The system as disclosed herein can be implemented by a programmer, using commercially available development tools for the particular operating system used.

Computer program means or computer program in the present context means any expression, in any language, code or notation, of a set of instructions intended to cause a system having an information processing capability to perform a particular function either directly or after either or both of the following a) conversion to another language, code, or notation; b) reproduction in a different material form.

In operation, audio signals representative of sound received in microphone 120 can be processed within computer 100 using conventional computer audio circuitry so as to be made available to the operating system 202 in digitized form. Alternatively, audio signals can be received via a computer communications network from another computer system in analog or digital format, or from another transducive device such as a telephone. The audio signals received by the computer system 100 are conventionally provided to the speech recognition engine 210 via the computer operating system 202 in order to perform speech recognition functions. As in conventional speech recognition systems, the audio signals can be processed by the speech recognition engine 210 to identify words spoken by a user into microphone 120.

Figure 3:
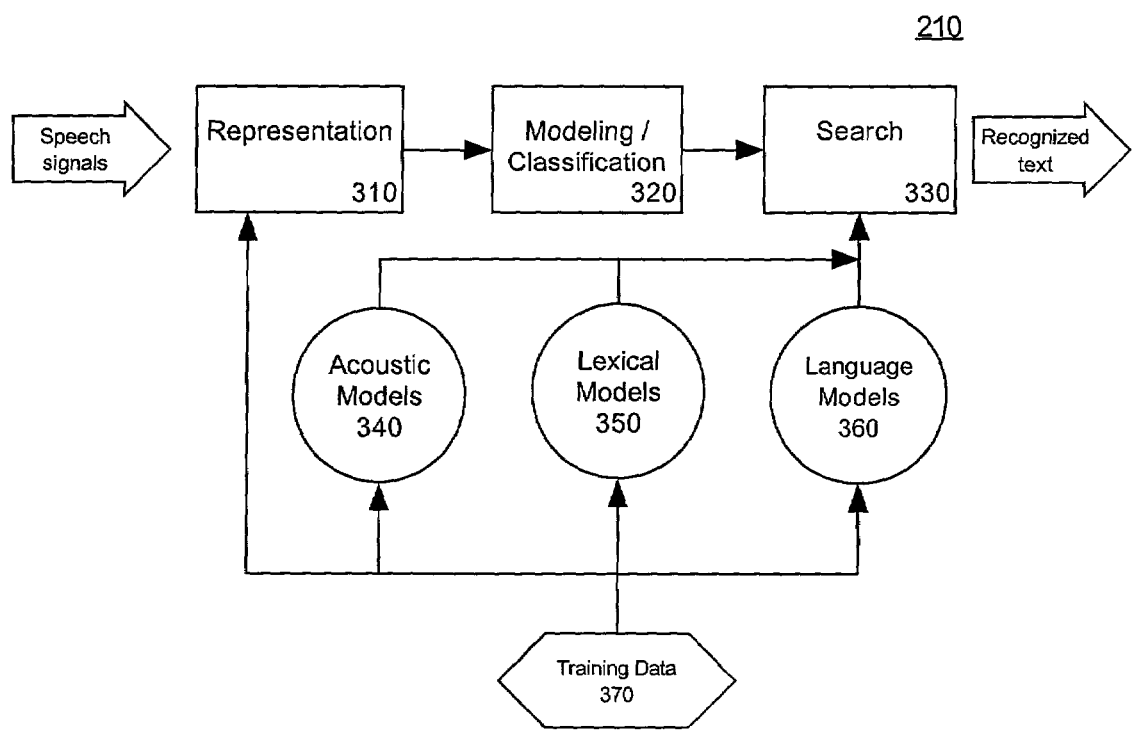
FIG. 3 is a block diagram showing typical components which can comprise a speech recognition engine.

FIG. 3 is a block diagram showing typical components which can comprise speech recognition engine 210. As shown in FIG. 3 the speech recognition engine 210 receives a digitized speech signal from the operating system. The system is subsequently transformed in representation block 310 into a useful set of data by sampling the signal at some fixed rate, typically every 10–20 msec. The representation block produces a new representation of the audio signal which can then be used in subsequent stages of the voice recognition process to determine the probability that the portion of the waveform just analyzed corresponds to a particular phonetic event. This process is intended to emphasize perceptually important speaker independent features of the speech signals received from the operating system. In modeling/classification block 320, algorithms process the speech signals further to adapt speaker-independent acoustic models to those of the current speaker. Finally, in search block 330, search algorithms are used to guide the search engine to the most likely words corresponding to the speech signal. The search process in search block 330 occurs with the help of acoustic models 340, lexical models 350, and language models 360.

Language models 360, for example n-grams and particularly trigrams, can be used to help restrict the number of possible words corresponding to a speech signal when a word is used together with other words in a sequence. The language model can be specified as a finite state network, where the permissible words following each word are explicitly listed. Each possible combination of n words can have a corresponding probability score expressing the likelihood that the combination of words can occur. The probability score can be derived from an analysis of a training corpus. In any case, it is often desirable to update the content of the language model with information concerning speech patterns likely to be encountered in the case of a specific user. The search process determines the word candidate having the highest confidence score as text output.

Once speech has been recognized in a speech recognition session, the semantic and syntactic accuracy can be enhanced during the post-processing portion of the recognition session using a grammar. A grammar is a formal specification of the structures allowable in a language where the rules can be denoted using Backus-Naur Form (BNF). Contrary to a language model, a grammar can unambiguously define each allowable language structure. For example, a sentence can be denoted as "S:=NP VP", where the well formed sentence "S" can consist of a noun phrase (NP) and a verb phrase (VP). Phrases and groups of phrases can be referred to as non-terminals. Accordingly, "NP" and "VP" can be referred to as non-terminals. Also, each element of the rule further can be parsed to the terminal or word level. For example, "NP:=ART N" can be a parse of a noun phrase having an article (ART) and a noun (N), such as "a boy". A grammar comprised of a system of rules having a single symbol on the left-hand side is said to be a context-free grammar. Additionally, CFGs can contain probability values such that particular rules can be assigned a probability value based on frequency. The probability value can be derived from analysis of training corpus using the maximum likelihood estimate from annotated parses. A CFG having probability values assigned to rules is called a probabilistic CFG.

Figure 4:
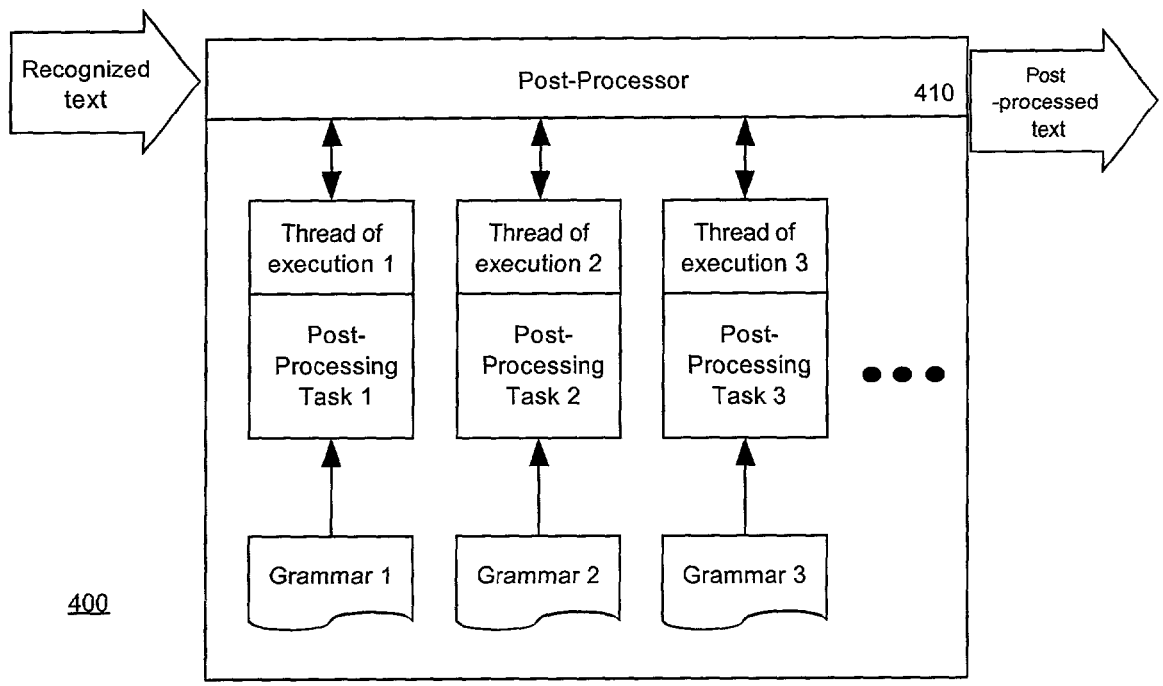
FIG. 4 is a block diagram showing exemplary components which can be included within a speech recognition engine in accordance with the inventive arrangements disclosed herein.

FIG. 4 is a block diagram 400 depicting a processor 410 which can be included within the speech recognition engine 210 of FIG. 3. In contrast to conventional speech recognition systems which can include a single-unified grammar, the processor 410 can include a plurality of grammars for performing one or more speech recognition tasks, each executing in a separate thread of execution. The plurality of grammars can be smaller grammar subsets of a larger unified speech recognition grammar. Each of the grammar subsets can he assigned a unique priority code. Both the priority code and the grammars subsets themselves can be determined by a system designer through an empirical study of user responses to prompts or a uaining corpus of text.

For example, a system designer can analyze expected user spoken utterances which a speech recognition system would likely be required to process. Typically, speech recognition systems serving as front end interfaces for back end dialog based systems receive a limited variety of user spoken utterances. The syntax and subject matter of allowable user spoken utterances, or user spoken utterances which the system can understand and process, can be limited. Accordingly, the expected user spoken utterances can be subdivided into one or more recognizable components. Notably, these components can be application specific. Once the components are determined, a unified grammar can be subdivided into smaller grammar subsets, wherein each grammar subset can correspond to an identified component. The priority codes can be assigned according to the relative importance of one component type in relation to the others. In other words, the priority codes can be determined based upon the contextual importance of each grammar with regard to the specific application being used in conjunction with the speech recognition engine.

In illustration, a speech recognition system for use with a financial system can include component types, and thus grammars, corresponding to particular transactions or accounts. The system designer can determine that user spoken utterances relating to accounts occur more frequently than user spoken utterances relating to transactions. Accordingly, the grammar subset for accounts can be assigned a higher priority code than the grammar subset relating to transactions. Similarly, a speech recognition system for use with a travel system can include components relating to travel type, destinations, or airports. Taking another example, in a dialog based telephone directory system, a user may be asked to say the name and the location of "Company X" before the system can supply Company X's telephone number. In that case, the name can be one component, while the location can be another component. Each component can correspond to a particular grammar subset.

The processor 410 can spawn a separate thread of execution corresponding to each grammar subset included in the speech recognition system. The processor 410 can initiate a processing task in each of the spawned threads of execution, wherein each processing task executing in a separate thread of execution processes the received text using a corresponding grammar subset. In this manner, the received text effectively can be processed in parallel by each grammar subset. Each task, upon completion, can provide a possible text phrase or result having a confidence score.

A confidence score reflects the likelihood that a particular word candidate accurately reflects a corresponding user spoken utterance. The confidence score can be a value derived from acoustic models, language models, and grammar subsets. For example, the confidence score can take into account the likelihood that a particular word candidate represents a user spoken utterance as determined using an acoustic model, in addition to, the probability that the particular word candidate can be located next to another word or group of words as determined using a language model and the grammar subset.

Based on the confidence score of each recognized possible phrase, the speech recognition system can identify the recognized possible phrase having the highest confidence score. If the scores for the recognized phases are equivalent, or are within a predetermined range of one another, the unique priority code can be consulted and the recognized phrase with the highest unique priority code can be chosen. Accordingly, based on the confidence score and the unique priority, the speech recognition system can select the result most likely to reflect the received user spoken utterance. Moreover, the use of priority codes can aid the speech recognition system to select the most contextually relevant result.

Figure 5:
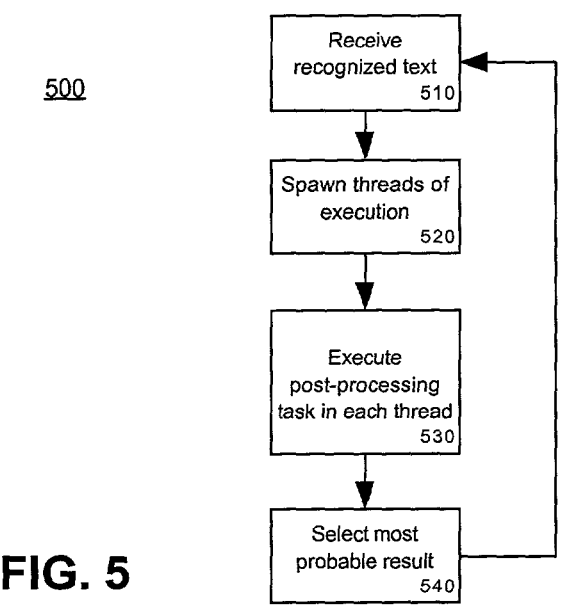
FIG. 5 is a flow chart illustrating an exemplary method of the invention.

FIG. 5 is a flow chart 500 illustrating an exemplary method of processing speech recognized text as performed by the computer system of FIG. 1. In step 510, within the speech recognition engine, initially recognized text can be provided to a processor. Continuing with step 520, the speech recognition engine can spawn a separate thread of execution for each one of the plurality of grammars within the speech recognition system.

In another embodiment of the invention, where a large number of identifiable components have been identified, the grammar subsets can be recombined or grouped into clusters of grammar subsets so as not to consume an excess of computing resources. The grammar subsets can be combined in accordance with several guidelines. Notably, grammar subsets not sharing any items or rules can be grouped. This can prevent ambiguity from being introduced within the grammar subset group. Also, the speech recognition system performance can be analyzed such that the grammar subset groups can be optimized with regard to subset group size and subset group combinations which result in increased speech recognition accuracy and decreased execution time. It should be appreciated that the grammar subset groups also can be assigned unique priority codes similar to the grammar subsets. After completion of step 520, the method can continue to step 530.

In step 530, each of the processing tasks can begin to execute and process the received text in a parallel fashion. As mentioned, each processing task processes the received text with a different grammar subset or grammar subset group. Each of the post-processing tasks can produce a possible recognition result. After each of the threads of execution completes, the method can continue to step 540.

In step 540, the speech recognition system can select the most probable recognition result from the possible recognition results provided by the processing tasks. The speech recognition system can select the possible recognition result having the highest confidence score. If multiple recognition results are identified with the same or similar confidence scores, for example, multiple confidence scores within a predetermined tolerance, the speech recognition system can select the identified recognized result provided from the processing task using the grammar subset with the highest priority code.

Another embodiment of the invention can be useful in cases where a response time can be more critical than the accuracy of the speech recognition. In that case, the processing tasks can be allowed only a predetermined and limited amount of time for completion. Specifically, the speech recognition system can restrict the selection of recognition results to only those from possible recognition results provided by the processing tasks which complete execution within the predetermined time limit. After completion of step 540, the method can be repeated as needed.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. In a speech recognition session, a method of speech processing utilizing a plurality of grammars, said method comprising:
   spawning a separate thread of execution corresponding to each one of said plurality of grammars;
   allocating a speech recognition task to each separate thread of execution for processing a user-spoken utterance to support a pre-selected application, each said speech recognition task producing a possible recognition result using said corresponding grammar;
   assigning to each of said plurality of grammars a unique priority code based on a contextual relevance of each grammar to the pre-selected application, said unique priority code being an ordinal measure of the likelihood that a particular word accurately reflects a corresponding user-spoken utterance; and
   identifying a possible recognition result produced by one of said speech recognition tasks.

2. The method of claim 1, further comprising determining a confidence score for each said possible recognition result.

3. The method of claim 2, wherein said identifying step identifies a possible recognition result having the highest confidence score.

4. The method of claim 1, wherein said identifying step identifies a possible recognition result produced using one of said plurality of grammars having a particular unique priority code.

5. The method of claim 1, wherein said grammar is a grammar subset.

6. The method of claim 1, wherein said grammar is a group of grammar subsets.

7. A machine readable storage for use in a speech recognition session, having stored thereon a computer program having a plurality of code sections executable by a machine for causing the machine to perform the steps of:
   for a plurality of grammars, spawning a separate thread of execution corresponding to each one of said plurality grammars;
   allocating a speech recognition task to each separate thread of execution for processing a user-spoken utterance to support a pre-selected application, each said speech recognition task producing a possible recognition result using said corresponding grammar;
   assigning to each of said plurality of grammars a unique priority code based on a contextual relevance of each grammar to the pre-selected application, said unique priority code being an ordinal measure of the likelihood that a particular word accurately reflects a corresponding user-spoken utterance; and
   identifying a possible recognition result produced by one of said speech recognition tasks.

8. The machine readable storage of claim 7, further comprising determining a confidence score for each said possible recognition result.

9. The machine readable storage of claim 8, wherein said identifying step identifies a possible recognition result having the highest confidence score.

10. The machine readable storage of claim 7, wherein said identifying step identifies a possible recognition result produced using one of said plurality of grammars having a particular unique priority code.

11. The machine readable storage of claim 7, wherein said grammar is a grammar subset.

12. The machine readable storage of claim 7, wherein said grammar is a group of grammar subsets.

13. In a speech recognition session, a method of speech processing utilizing a plurality of grammars, the method comprising:
- spawning a separate thread of execution corresponding to each one of the plurality of grammars;
- allocating a speech recognition task to each separate thread of execution, each speech recognition task producing a possible recognition result based on a corresponding grammar;
- assigning a unique priority code to each of the plurality of grammars, the unique priority code being an ordinal measure of the likelihood that a particular recognition result reflects a corresponding user-spoken utterance;
- determining a confidence score for each of the possible recognition results, each confidence score corresponding to a likelihood that a possible recognition result correctly corresponds to the user-spoken utterance; and
- selecting a likely recognition result produced by one of the speech recognition tasks by identifying a recognition result having a highest confidence score, wherein, if a difference between any two or more of the recognition results is within a predetermined threshold, a recognition result produced using a grammar having a highest priority code.

14. The method of claim 13, wherein each grammar has no grammar rule that duplicates a grammar rule of any other of the plurality of grammars.

15. The method of claim 13, wherein each grammar is a subset of a larger unified grammar.

16. The method of claim 15, wherein at least one grammar comprises a plurality of subsets of the larger unified grammar.

* * * * *